(12) United States Patent
Di Censo et al.

(10) Patent No.: US 9,756,319 B2
(45) Date of Patent: Sep. 5, 2017

(54) VIRTUAL SEE-THROUGH INSTRUMENT CLUSTER WITH LIVE VIDEO

(71) Applicant: Harman International Industries, Incorporated, Stamford, CT (US)

(72) Inventors: Davide Di Censo, San Mateo, CA (US); Stefan Marti, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 291 days.

(21) Appl. No.: 14/192,043

(22) Filed: Feb. 27, 2014

(65) Prior Publication Data

US 2015/0245017 A1    Aug. 27, 2015

(51) Int. Cl.

| | | |
|---|---|---|
| *H04N 13/04* | (2006.01) | |
| *B60K 37/02* | (2006.01) | |
| *B60R 1/00* | (2006.01) | |
| *G08G 1/16* | (2006.01) | |
| *H04N 13/02* | (2006.01) | |
| *B60W 50/14* | (2012.01) | |
| *G02B 27/01* | (2006.01) | |

(52) U.S. Cl.
CPC ........ *H04N 13/0425* (2013.01); *B60K 37/02* (2013.01); *B60R 1/00* (2013.01); *G08G 1/166* (2013.01); *G08G 1/167* (2013.01); *H04N 13/0203* (2013.01); *H04N 13/0468* (2013.01); *H04N 13/0484* (2013.01); *B60K 2350/2017* (2013.01); *B60R 2300/101* (2013.01); *B60R 2300/107* (2013.01); *B60R 2300/202* (2013.01); *B60R 2300/207* (2013.01); *B60R 2300/307* (2013.01); *B60R 2300/605* (2013.01); *B60R 2300/802* (2013.01); *B60W 2050/146* (2013.01); *G02B 2027/0134* (2013.01)

(58) Field of Classification Search
CPC ........... H04N 13/0425; H04N 13/0484; B60K 37/02; B60K 2350/2017
See application file for complete search history.

(56) References Cited

U.S. PATENT DOCUMENTS

| | | | |
|---|---|---|---|
| 5,883,739 A | 3/1999 | Ashihara et al. | |
| 8,576,286 B1 | 11/2013 | Childs | |
| 9,104,275 B2 * | 8/2015 | Kim | G06F 3/041 |
| 2010/0289899 A1 | 11/2010 | Hendron et al. | |
| 2011/0169625 A1 * | 7/2011 | James | B60Q 9/008 |
| | | | 340/439 |

(Continued)

FOREIGN PATENT DOCUMENTS

| | | |
|---|---|---|
| DE | 102005048232 A1 | 4/2007 |
| JP | 2000177483 A | 6/2000 |
| JP | 2005086754 A | 3/2005 |

OTHER PUBLICATIONS

EP Search Report for Application 15 15 5749, dated Jul. 6, 2015.
(Continued)

*Primary Examiner* — Nam Pham
(74) *Attorney, Agent, or Firm* — Artegis Law Group, LLP

(57) ABSTRACT

At least one embodiment disclosed herein includes generating a three-dimensional graphical output that includes a three-dimensional representation of a video of an area external to a vehicle, and displaying the three-dimensional graphical output on a three-dimensional display disposed within a vehicle.

22 Claims, 13 Drawing Sheets

(56) References Cited

U.S. PATENT DOCUMENTS

| | | | | |
|---|---|---|---|---|
| 2014/0035942 A1* | 1/2014 | Yun | ................. | G09G 5/006 345/592 |
| 2014/0354798 A1* | 12/2014 | Galarraga | .............. | H04N 7/183 348/113 |
| 2015/0116197 A1* | 4/2015 | Hamelink | ............... | G06F 3/013 345/156 |
| 2015/0145995 A1* | 5/2015 | Shahraray | ............. | H04N 7/181 348/148 |

OTHER PUBLICATIONS

Nora Broy et al: "Is stereoscopic 3D a better choice for information representation in the car? ", Proceedings of the 4th International Conference on Automotive User Interfaces and Interactive Vehicular Applications. Automoti v EU I I 12 • Jan. 1, 2012 (Jan. 1, 2012). p. 93.

Karen KrUger: "Nutzen und Grenzen von 5 3D-Anzeigen in Fahrzeugen", PhD Thesis, Nov. 9, 2007 (Nov. 9, 2007), XP055198480, Retrieved from the Internet: URL:http:f/d-nb.info/ 989764192/34. [retrieved on Jun. 25, 2015].

* cited by examiner

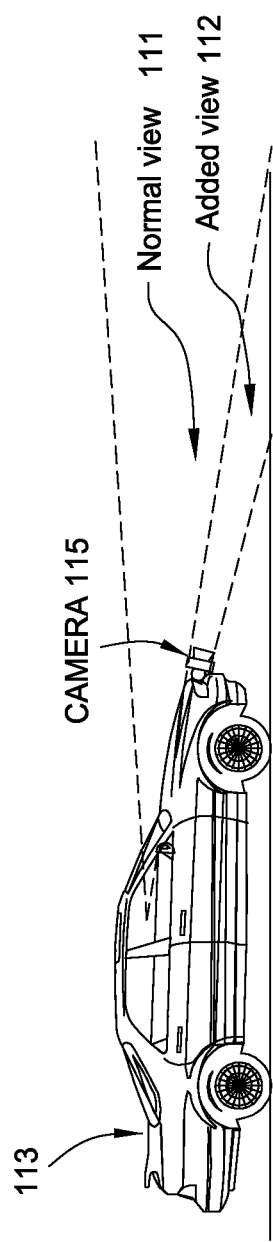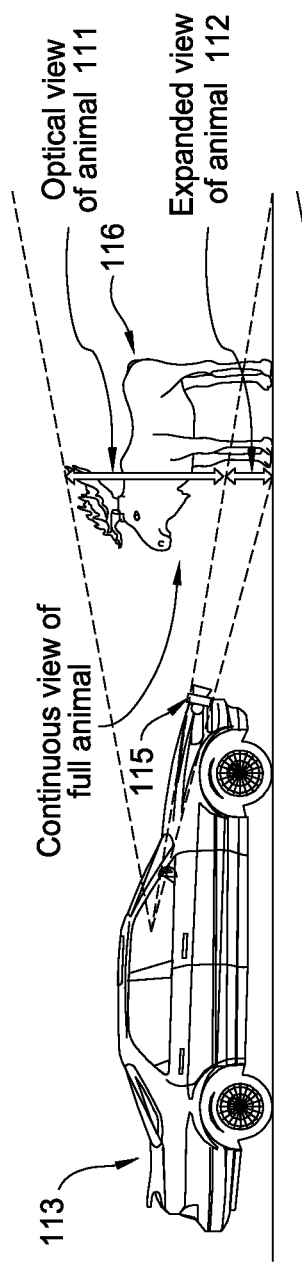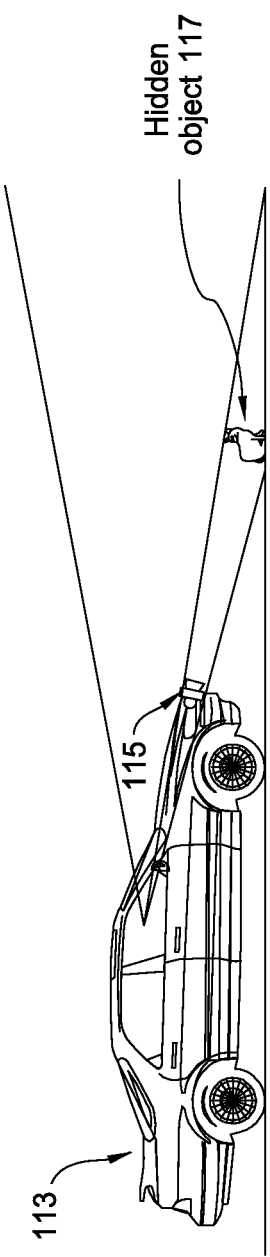

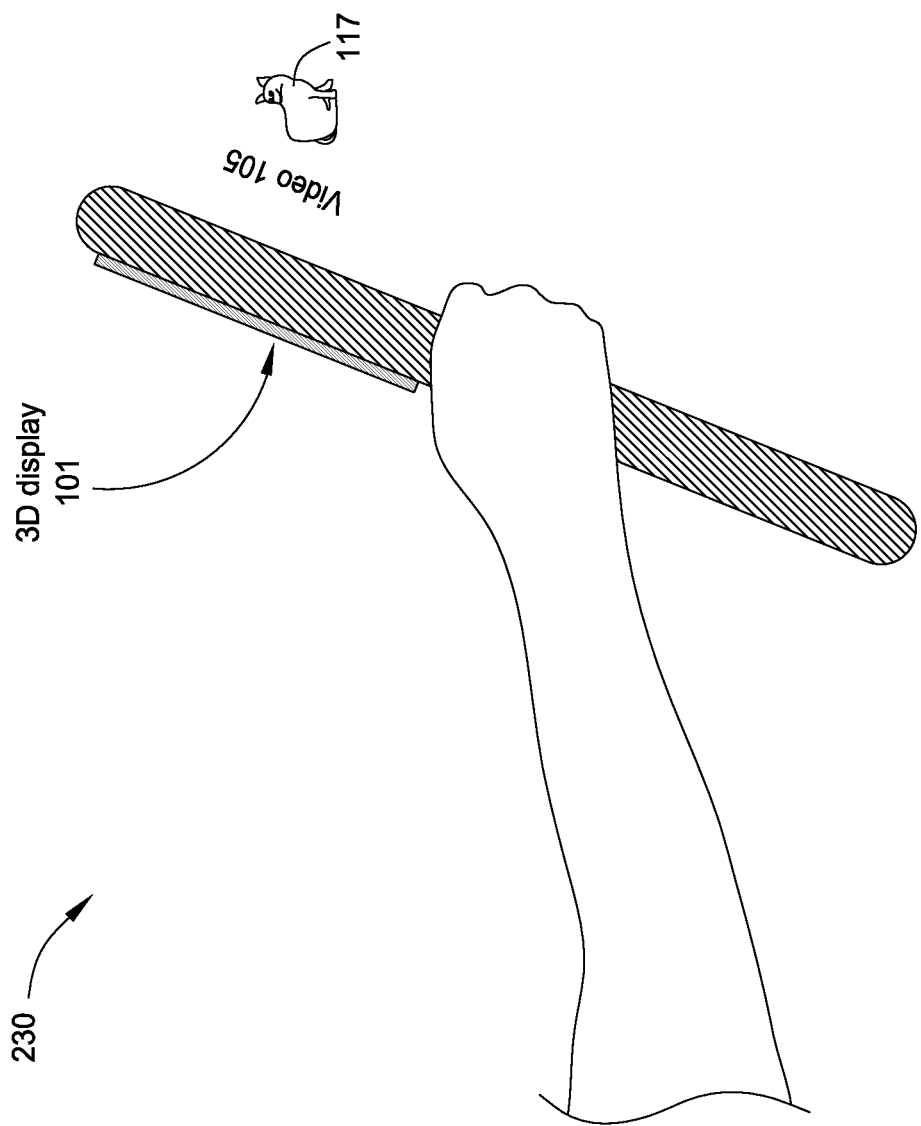

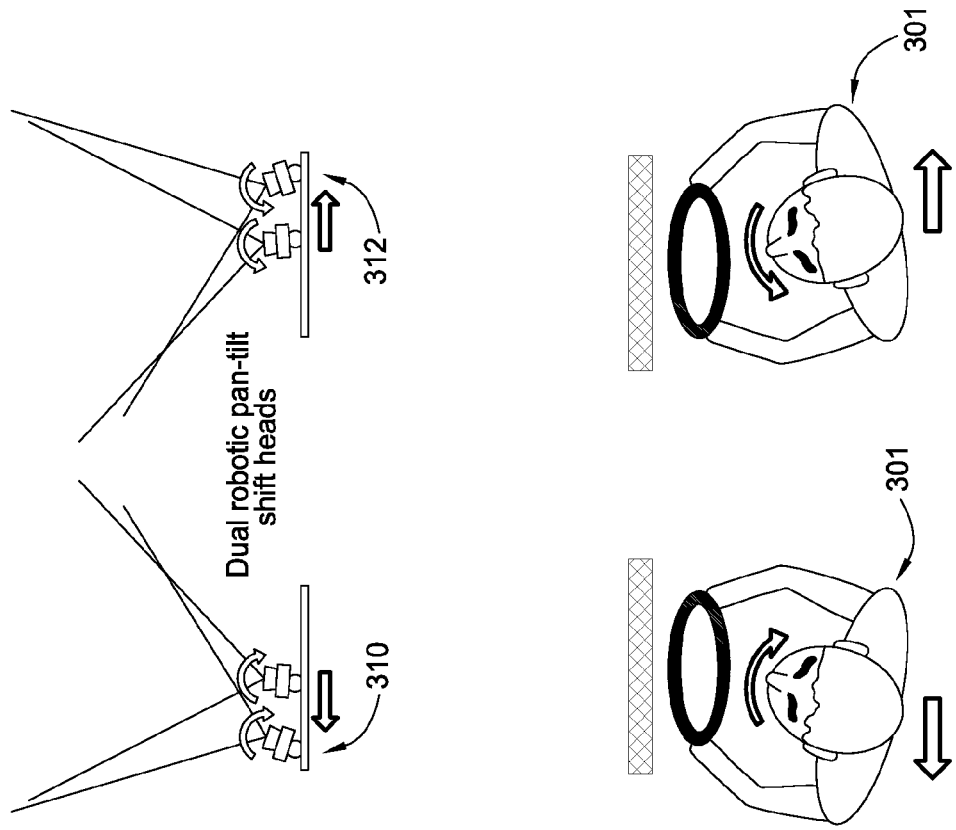
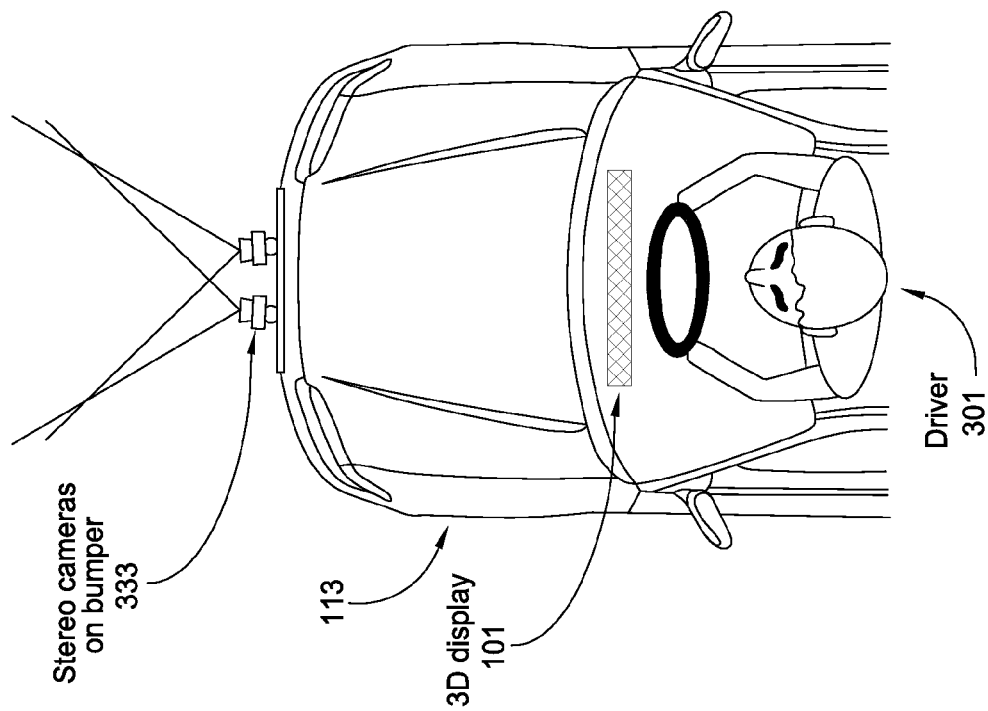
FIG. 3A  FIG. 3B  FIG. 3C

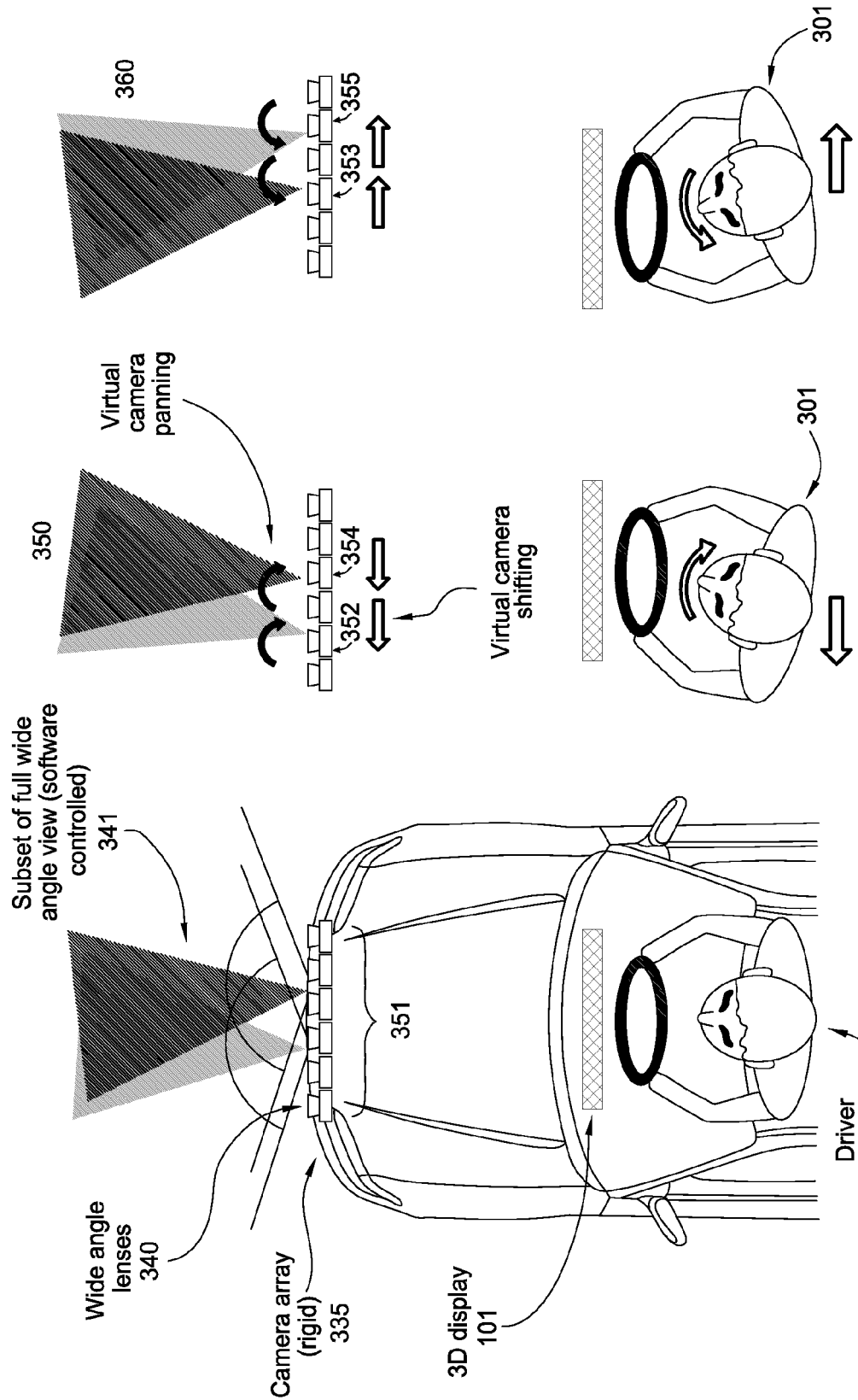

VIRTUAL SEE-THROUGH INSTRUMENT CLUSTER WITH LIVE VIDEO

BACKGROUND

Traditionally, a driver's view of the area in front of a vehicle has been obstructed by the instrument control panel, hood, and underlying components of the vehicle. As such, objects and other items may be in front of the vehicle, but the driver or other passengers of the vehicle are unable to view them.

SUMMARY

At least one embodiment disclosed herein comprises generating a three-dimensional graphical output that includes a three-dimensional representation of a video of an area external to a vehicle, and displaying the three-dimensional graphical output on a three-dimensional display disposed within a vehicle.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

FIGS. 1A-1E are schematic illustrations of different views from a vehicle, according to various embodiments of the present invention.

FIGS. 2A-2C are schematic illustrations of a system with a virtual and partially transparent instrument cluster with live video, according to various embodiments of the present invention.

FIGS. 3A-3F are schematic illustrations of a vehicle with view-dependent cameras, according to various embodiments of the present invention.

DETAILED DESCRIPTION

Figure 1D:
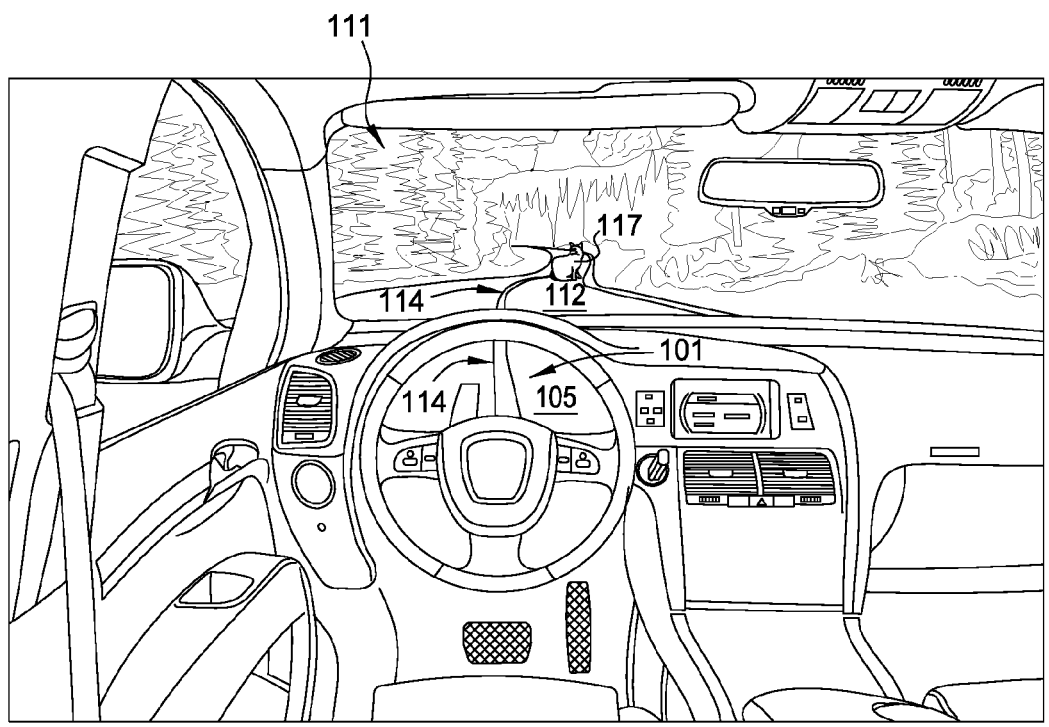

Embodiments disclosed herein provide a three-dimensional rendering of a live video of an area external to a vehicle, on a stereoscopic, parallax-enabled three-dimensional display (referred to herein as a "3D display") in the vehicle. In one embodiment, the area external to the vehicle is a "blind spot" obstructed by the hood of the vehicle, which is typically not visible to a driver. However, the video may be of any area external to the vehicle. The 3D video rendered on the 3D display may be viewpoint dependent, such that the 3D video is based on the driver's current gaze (or viewing angle). For example, and without limitation, if the driver is looking forward, a forward oriented view of the 3D video may be output on the 3D display. If, however, the driver turns his head to the left and moves inward, a camera may capture the video in a way to mirror the shift in the driver's gaze. Therefore, the 3D output may reflect a view that is zoomed in and from a left-facing perspective.

In addition, the system may also output a three-dimensional instrument control panel such that it appears closer to the driver, while outputting the 3D video at a depth further away from the driver, providing a partially transparent instrument control panel on top of the 3D video of the outside world. However, a user can control the depth positioning of each layer, such that the 3D video, and one or more of the elements in the instrument control panel appear closer to or further away from the driver's face. The user can control the depth positioning by any feasible method, including physical controllers, sliders, buttons, or digital settings on the 3D display (or a center console display). Additionally, each user may define a set of preferences indicating preferred placement, ordering, and appearance of different items displayed on the 3D display. Furthermore, the system can adjust the layering order as well as modify different elements at appropriate times.

For example, and without limitation, a foreign object detected in the road may cause the video (and the object) to be brought closer to the driver's face. In such an example, and without limitation, the 3D instrument control panel may be made more transparent, or disappear completely. As another example, if a driver's speed exceeds the current speed limit, the system may modify the 3D rendering of the speedometer by moving it closer to the driver's face and giving the speedometer additional emphasis (such as a different color or bolder shading) to note the importance of the speedometer given the current driving context. A "driving context," as used herein, refers to a context used to identify one or more elements or layers displayed on the 3D display that should be moved or altered in any way. The driving context may include, but not is limited to, the vehicle's speed, the vehicle's location, an attribute or state of the vehicle (such as gas levels, fluid levels, or tire pressure), applicable laws or regulations at the vehicle's location, weather conditions, triggering events, and the like. In other embodiments, the system may detect the driver's gaze and move an instrument the driver is looking at closer to the driver's face. For example, and without limitation, if the system determines that the driver is looking at a tachometer, the system may move the tachometer closer to his face.

All items output for display on a three-dimensional display include a depth (or z-axis) component. The Figures, being two-dimensional recreations of the three-dimensional output generated by a 3D display, may not adequately capture the depth, or z-axis of the three-dimensional output, and should not be considered limiting of the disclosure.

FIG. 1A is a schematic illustration 100 of different views of a driver in a vehicle, according to various embodiments of the present invention. Traditionally, a driver (not shown) of a vehicle 113 sees a normal view 111. The normal view 111 depicts a field of vision viewed by a driver sitting in the driver's seat of the vehicle 111. However, the normal view 111 is generally obstructed by the hood of the vehicle (and underlying engine and other components). Embodiments disclosed herein, however, use one or more cameras 115 to capture three-dimensional video of the external world, which includes the added view 112. The added view 112 may be displayed on a 3D display in the vehicle 101, providing the driver with both the normal view 111 and the added view 112. The camera 115 used to capture video may be a two dimensional RGB camera that also captures depth information per pixel, which is used by the system that includes a 3D model to generate a 3D rendering of the captured video. In another embodiment, a 3D camera may be used to capture the 3D video which is then used as a 3D model by the system. In still another embodiment, a fixed array of cameras mounted to the bumper of the vehicle 113 can capture the video. By selecting two or more of the cameras in the array of cameras, each of which has a wide-angle lens, the 3D display 101 can create a composite image by selecting a subset of the image data from each of the selected lenses. The cameras may be selected based on the head position and the viewing angle of the driver.

FIG. 1B is a schematic illustration of 110 different views of a driver in a vehicle, according to various embodiments of the present invention. As shown, the driver continues to experience the normal view 111, while the cameras 115 allow the driver to view an expanded view 112. In conjunction, the normal view 111 and the expanded view 112 allow the driver to view a full, continuous view of an animal 116 in front of the vehicle.

FIG. 1C is a schematic illustration 120 of different views of a driver in a vehicle, according to various embodiments of the present invention. As shown, the driver continues to experience the normal view 111, while the cameras 115 allow the driver to view an expanded view 112. Because of the expanded view 112, the driver is now able to see a cat 117 that was otherwise hidden from the driver's view, and may have been struck with the vehicle without the expanded view 112.

FIG. 1D is a schematic illustration of an enhanced user interface 130 in a vehicle, according to various embodiments of the present invention. A person looking through the windshield 111 receives a traditional view of the outside world that includes a road 112 that the vehicle is driving on. The driver's view, as previously discussed, is limited in that the driver cannot see an area of the road 112 that is in front of the vehicle but obstructed by the vehicle itself. However, as shown, a display surface 101 in the vehicle dashboard may display an extended view of the outside world. As shown, the display surface 101 displays a three-dimensional video 105 of video captured external to the vehicle. When the driver moves his head or eyes, changing his gaze, the video 105 displayed may be altered move to match the driver's new gaze. One or more cameras 115 capturing the video 105 may move robotically with six degrees of freedom in order to capture the video from a perspective matching the driver's gaze. Therefore, as shown, a portion of the road 112 that is not visible to the driver is now displayed on the display surface 101. Because the display surface 101 is viewpoint dependent, the output of the 3D display matches the driver's current gaze (or viewing angle associated with the current gaze). The video 105 displayed on the display surface 101 in FIG. 1D, therefore, may reflect a view of the road 112 when the driver has an approximately forward facing gaze. However, if the driver turns his head significantly to the right, the yellow line 114 of the road may not be captured by the camera 115 and subsequently not outputted for display as part of the video 105 on the display surface 101.

In some embodiments, the display surface 101 is a stereoscopic, parallax enabled, viewpoint dependent three-dimensional display (also referred to as the 3D display). The stereoscopic feature of the display surface 101 allows viewers to see images with three-dimensional depth similarly to real objects by delivering two different images per frame, one image for the right eye, and one image for the left eye. The images for each eye may be slightly different in order to convey the difference in perception from the two eyes. In at least some embodiments, the display surface 101 has at least a 120 Hz refresh rate.

The display surface 101 also provides viewpoint dependent rendering that allows for more realistic 3D perception of the images displayed by accounting for the driver's current point of view when generating output. In order to implement viewpoint dependent rendering, user-facing sensors (not shown) track the driver's head and/or eyes in order to deliver a three-dimensional rendering of the objects matching the driver's current gaze. Therefore, when the driver moves his head or eyes, the output of the display surface 101 is altered based on the driver's current gaze (or a viewing angle associated with the driver's gaze). The user-facing sensors may be connected to computer vision software (local or remote) for scene analysis and head tracking. The user facing sensors can be mounted inside or outside of the vehicle as long as they face the user. A single sensor, multiple sensors, or sensors mounted on a pan-tilted assembly whose orientation is controlled by the system described herein may be used. The parallax motion effect of the three-dimensional display 101 conveys to the viewer the feel of a real object's depth, where objects closer to the viewer appear to move faster than objects farther away when moving sideways.

In one embodiment, a user wears 3D glasses (not shown) in order to decode the stereoscopic images (one for the left eye, and one for the right eye) and view the enhanced user interface 110. The glasses may be any type of 3D glasses, including passive or active, shutter based or polarized, and the like. The glasses, having different lenses for the left and right eye, allow only the image intended for each eye to be delivered to the eye. Therefore, the glasses only delivery the image for the right eye to the right eye only, and the image for the left eye to the left eye only. In one embodiment, the display surface 101 may be used without glasses based on lenticular overlays. One example of a display surface 101 with glasses and user-facing sensors is The zSpace® System by zSpace, Inc.®

Figure 1E:
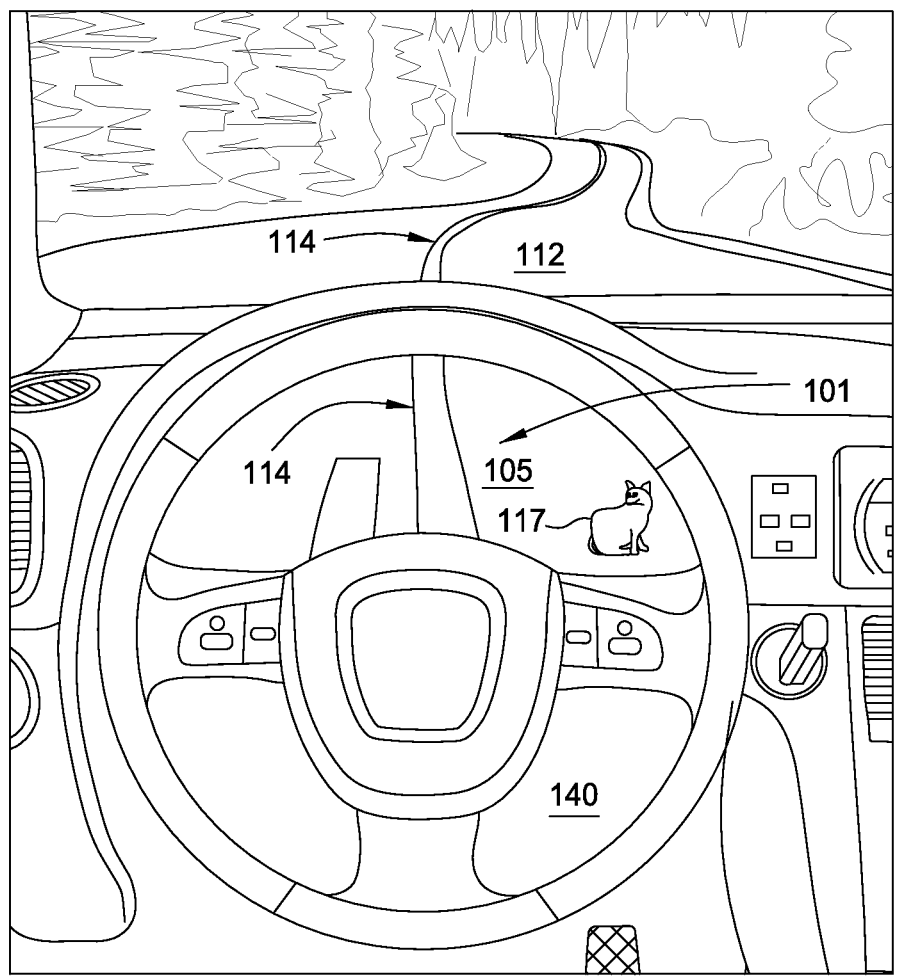

FIG. 1E is a schematic illustration of an enhanced user interface 140 in a vehicle, according to various embodiments of the present invention. As shown, the display surface 101 includes the video 105 of the outside of the world. The video 105 includes a view of the road 112 and the yellow line 114. Any objects in view of the camera may be included in the video 105, such as the cat 117. Again, the video 105 is a view-dependent rendering, and is therefore based on the driver's gaze (or the viewing angle associated with the gaze). Thus, the view 105 in FIG. 1D depicts an approximately forward facing gaze.

Figure 2A:
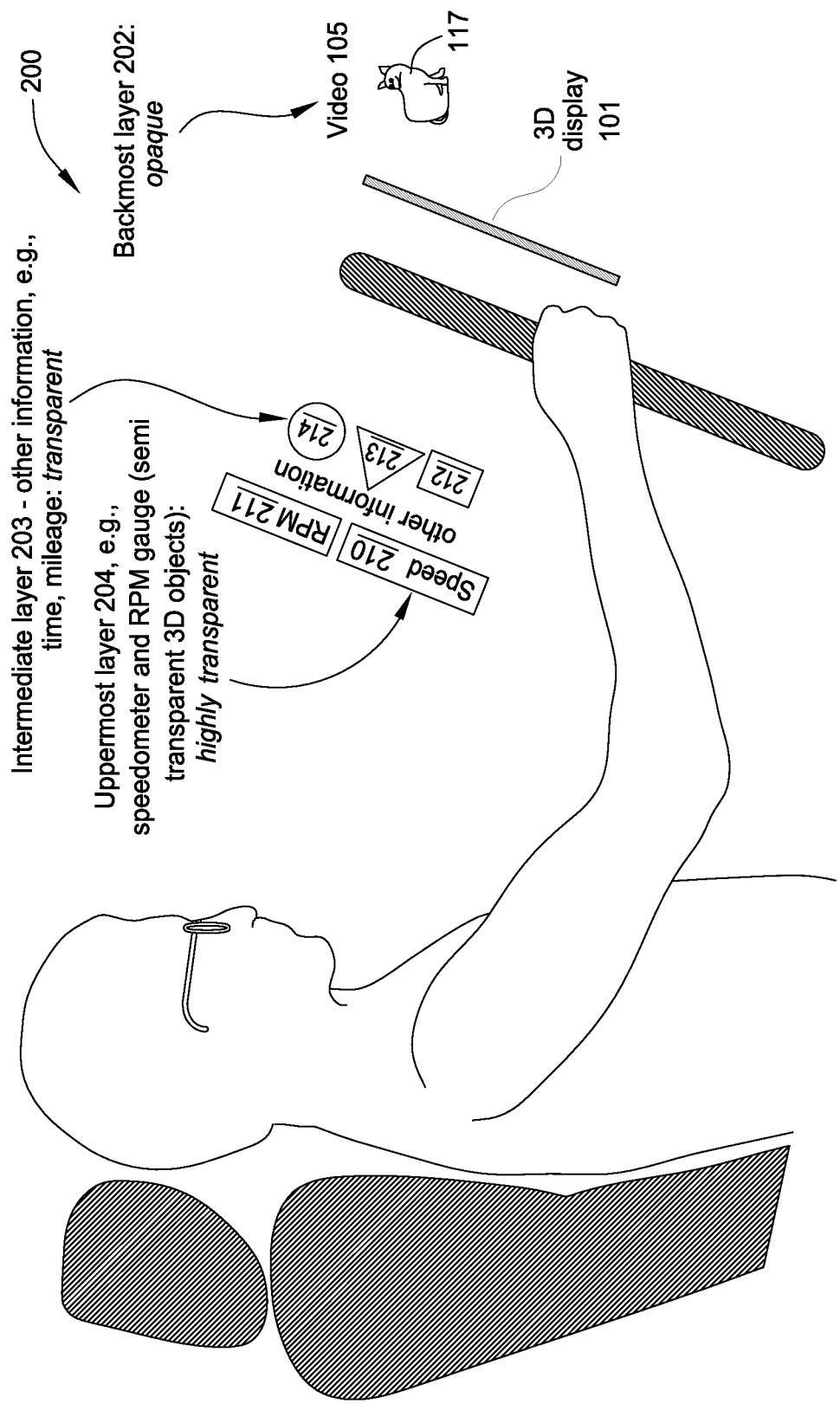

FIG. 2A is a schematic illustration of a system 200 including, without limitation, a virtual see-through instrument cluster including elements 210-214 and three-dimensional video 105, according to various embodiments of the present invention. As shown, a driver 220 is seated at a steering wheel 221 in a vehicle. The driver 220 is wearing 3D glasses 222 to allow the stereoscopic images for each frame to be delivered to the correct eye. A display surface 101 is positioned behind the steering wheel 221, such as in the vehicle dashboard (not pictured). However, the 3D display may be mounted on the steering wheel 221, or placed in any other location that can be viewed by the driver 220. The display surface 101 is configured to output information that is seen by the driver 220 at any number of different depth levels. As shown, the 3D display outputs three different layers 202-204, each of which appear to the driver 220 as being between the driver 220 and the display surface 101. Each layer has one or more display elements 210-214 and the 3D video 105 rendered by the display surface 101. As shown, the video 105 includes, for example and without limitation, the cat 117 that is in front of the vehicle but otherwise obstructed from the driver's traditional view 111. Although the system 200 is depicted as including three layers 202-204 and the elements 210-214, the system 200 is capable of outputting any number of elements on any number of layers, and the specific depictions of layers and elements herein should not be considered limiting of the disclosure.

The backmost layer 202, which may be opaque due to its positioning as being furthest away of the three layers from the driver 220, includes the three-dimensional video 105, which includes a number of different elements (such as buildings, trees, roads, and any other object) that each have their own respective depths. The intermediate layer includes elements 212-214 for other information that is output by the 3D display for the driver. For example, and without limitation, the elements 212-214 may include navigation instructions, instrument controls, or other notifications and messages. The elements 212-214 may each have their own shapes, sizes, colors, or depths, and appear to the driver 220 as being between the backmost layer 202 and the uppermost layer 204. The display elements in the intermediate layer 203 may be slightly transparent in order to allow the driver to see the video 105. The uppermost layer 204 includes a speedometer 210 and a tachometer 211, each of which may take any shape, form, color, or depth. The display elements in the uppermost layer 204 may be highly transparent in order to allow the driver 220 to see the display elements in the intermediate layer 203 and the backmost layer 202. Generally, any number of controls, notifications, and the like can be displayed in each layer 202-204, or across different layers, and the particular configuration depicted in FIG. 2A should not be considered limiting of the disclosure. In addition, user preferences may specify the initial ordering of the layers 202-204, as well as which elements 210-214 and the 3D video 105 appear in those layers.

FIG. 2B is a schematic illustration of a system 230 including, without limitation, a three-dimensional video 105, according to various embodiments of the present invention. As shown, FIG. 2B depicts a configuration where the display surface 101 is mounted on the steering wheel 221. As shown, only the 3D video 105 is displayed, as the system 230 is now in "see-through mode," such that the instrument cluster is removed from view so as to not obstruct the driver's view of the video 105. The video 105 has a negative parallax, such that objects in the video, such as the cat 17, appear to be behind the steering wheel 221 from the perspective of the driver 220. Generally, the display surface 101 may be placed in any reasonable configuration. In some embodiments, the video 105 and objects therein will appear with a negative parallax, such that they are behind the display surface 101. However, if the driving context or other factors indicate that the video 105, or objects therein, are important and should be viewed by the driver, the video 105 or the objects therein may be moved closer to the driver, such that they have a more positive parallax.

Figure 2C:
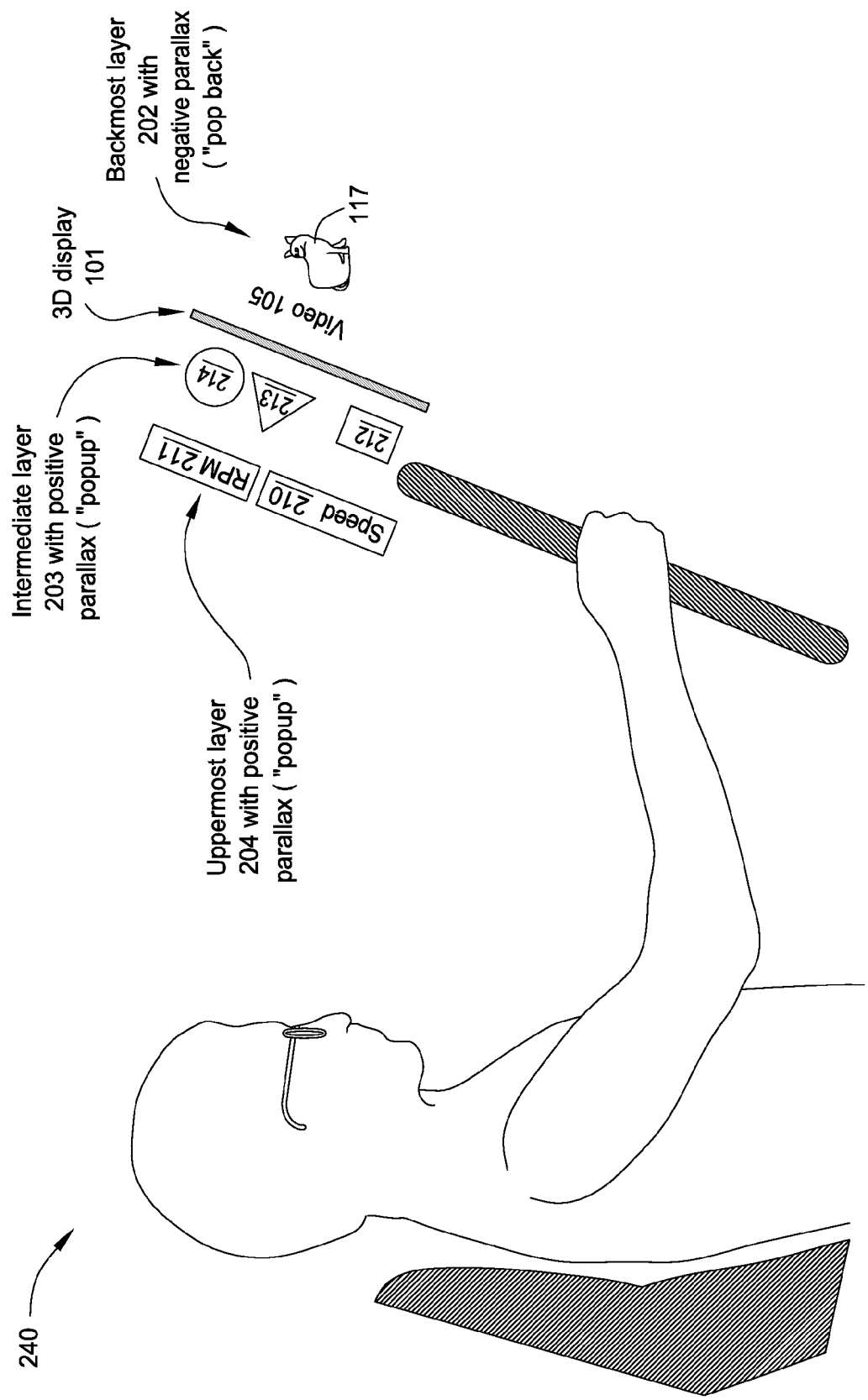

FIG. 2C is a schematic illustration of a system 240 including, without limitation, a virtual see-through instrument cluster including elements 210-214 and three-dimensional video 105, according to various embodiments of the present invention. As shown, FIG. 2C depicts an embodiment where the 3D display is not mounted to the steering wheel, and includes different parallax effects. For example, and without limitation, the video 105 of layer 202 has a negative parallax effect, such that it (and the cat 117) appears behind the display surface 101 from the perspective of the driver 220. The intermediate and uppermost layers 203-204, however, have positive parallax effects, such that the speedometer 210, and tachometer 211, and the other elements 212-214 appear in front of the display surface 101 from the perspective of the driver 220.

Although FIGS. 2A-2C depict embodiments where the 3D display 101 is mounted in different positions, the particular hardware configuration and location of the 3D display 101 generally do not control the specific location that objects are rendered from the driver's perspective. However, the placement of the 3D display 101 may influence whether rendered objects have a positive or negative parallax effect. For example, and without limitation, if the element 210 needs to be rendered at a distance of 50 centimeters from the driver's face, this can be accomplished by software regardless of the physical location of the 3D display 101. If the 3D display 101 is mounted 55 centimeters from the driver's face, the element 210 will have a positive parallax effect. If, however, the 3D display is mounted 40 centimeters from the driver's face, the element 210 will have a negative parallax effect. In either scenario, however, the element 210 appears to the driver as if it is 50 centimeters away from his face. Furthermore, the objects in the video 105 may have a negative parallax corresponding to their actual distance from the vehicle in real life. Therefore, in most embodiments, objects in the video 105, such as the cat 117, will be rendered with a negative parallax. Generally, the objects in the video 105 are displayed at a distance from the driver that corresponds to a distance between the objects and the vehicle 113. For example, and without limitation, if a basketball (not pictured) was farther away from the vehicle 113 than the cat 117, the cat 117 would be rendered closer to the driver's face than the basketball.

FIG. 3A is a schematic illustration of a vehicle 113 with two view-dependent cameras 333, according to various embodiments of the present invention. As shown in FIG. 3A, the cameras 333 are mounted on the front bumper of the vehicle. The view-dependent cameras 333, in at least one embodiment, are capable of pan movement, tilt movement, and three-dimensional shift movements, with up to six degrees of freedom. In some embodiments, the view-dependent cameras 333 have three degrees of freedom, namely pan movement, tilt movement, and one-dimensional lateral shift movement. Therefore, as shown in FIG. 3B, when the driver 301 moves his head to the right, the cameras 333 also move laterally (e.g., on a rail or slider with linear actuator) to match the driver's new gaze, as shown in configuration 310. Similarly, as shown in FIG. 3C, when the driver 301 moves his head to the left, the cameras also shift their perspective in order to provide a view-dependent video, as shown in configuration 312. One or more sensors (not shown) may track the driver's gaze by emitting signals that reflect off of the glasses 222 that the driver may be wearing. When the sensors detect a shift in the driver's gaze (or the driver's viewing angle), the cameras 333 are adjusted accordingly.

FIG. 3D is a schematic illustration of a vehicle 113 with an array 335 of rigid cameras 351. Each camera 351 is fixed to the vehicle 113 and does not move. Although the array 335 may include any number of cameras, in this example, the array 335 includes six cameras 351. Each of the cameras 351 includes a wide angle lens 340. Software can be used to create a composite view of the full wide-angle view of each camera 351, as shown in subset 341. The subset 341 corresponds to the gaze of the driver 351, which in FIG. 3D is straight ahead. However, as shown in FIG. 3E, when the driver 301 shifts his gaze to the right, the field of view 350 may be captured from a corresponding subset of the views of cameras 352 and 354. Similarly, in FIG. 3F, when the driver 301 shifts his gaze to the left, the field of view 360 may be captured from a subset of the views of cameras 352 and 354. In addition, different cameras 351 in the array 335 may be used to capture video, depending on the gaze of the driver 301.

Figure 4:
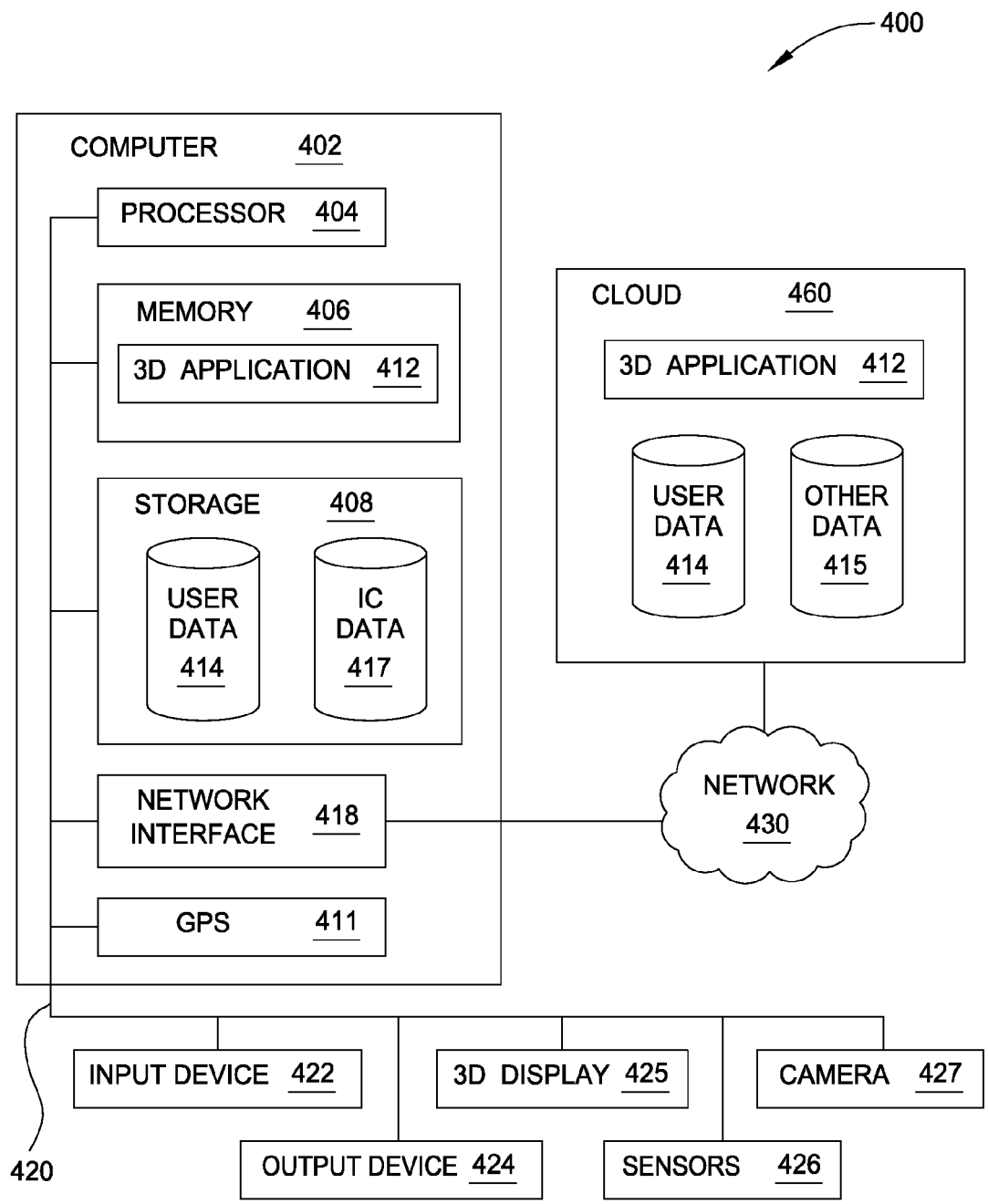
FIG. 4 illustrates a system configured to generate a virtual see-through instrument cluster with live video, according to various embodiments of the present invention.

FIG. 4 illustrates a system 400 to generate a virtual see-through instrument cluster including elements 210-214 and three-dimensional video 105 for display to a driver of a vehicle, according to various embodiments of the present invention. In one embodiment, the computer 402 is in a vehicle, such as a car, truck, bus, or van. The vehicle may be equipped with one or more information delivery systems (also referred to as an in-vehicle infotainment (IVI) system). The computer 402 may also be connected to other computers via a network 430. In general, the network 430 may be a telecommunications network and/or a wide area network (WAN). In a particular embodiment, the network 430 is the Internet. As shown, the network 430 facilitates communication between the computer 402 and a cloud computing environment 460.

The computer 402 generally includes a processor 404 connected via a bus 420 to a memory 406, a network interface device 418, a storage 408, an input device 422, and an output device 424. The computer 402 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 404 is included to be representative of a single CPU, multiple CPUs, a single CPU having multiple processing cores, and the like. The network interface device 418 may be any type of network communications device allowing the computer 402 to communicate with other computers via the network 430.

The storage 408 may be a persistent storage device. Although the storage 408 is shown as a single unit, the storage 408 may be a combination of fixed and/or removable storage devices, such as fixed disc drives, solid state drives, SAN storage, NAS storage, removable memory cards or optical storage. The memory 406 and the storage 408 may be part of one virtual address space spanning multiple primary and secondary storage devices.

The input device 422 may be any device for providing input to the computer 402. For example, and without limitation, a keyboard and/or a mouse, a touch screen interface, or controllers such as a joystick may be used. The output device 424 may be any device for providing output to a user of the computer 402. For example, and without limitation, the output device 424 may be any conventional display screen or set of speakers. Although shown separately from the input device 422, the output device 424 and input device 422 may be combined. For example, and without limitation, a display screen with an integrated touch-screen may be used. The global positioning system (GPS) 411 is a module configured to track the location of the vehicle using GPS technology.

A camera 427 is used to obtain a real-time 3D video stream of the outside world. Generally, the 3D video provides a realistic augmented reality effect of an area outside the vehicle, such as the driver's blind spot in front of the vehicle. The camera 427 may be one or more cameras implementing any feasible video capture method. For example, and without limitation, two cameras 427 may be mounted on the front of the vehicle, arranged side-by-side at an average human intraocular distance, resulting in a stereo camera. The stereo cameras may deliver two video streams from slightly different perspectives, which, when synced with display switching hardware, the left camera frames are only delivered to the driver's left eye, while the right camera frames are only delivered to the driver's right eye. This configuration provides the driver a 3D stereoscopic view with realistic depth effect.

In another embodiment, the camera 427 may be a depth enabled RGB camera (implementing time-of-flight, structured light, or other feasible approach) mounted on the front of the vehicle which provides depth information for each captured pixel. In still another embodiment, the camera 427 may include an array of fixed cameras, whose image data is used to create composite images from the field of view of two or more of the fixed cameras. The system may then use the depth information to deform a computer-generated 3D object (e.g., thin or flat virtual projection surface approximately perpendicular to the driver), with deformations representing objects in front of the vehicle. After creating this projection surface, the image from the RGB camera may be projected onto the projection surface as a texture to convey the actual visual representation of the objects in front of the vehicle. The depth information may be captured by sensors that are part of the camera 427, or sensors external to the camera.

Depending on the amplitude of the driver's head (or eye) movements and the cameras the vehicle has, the system can change the display in a number of ways. For example, and without limitation, fixed cameras may be used to allow minimal to no changes based on driver head movements (circular or shifting left-right). Generally, if the amplitude of the head or eye movements does not exceed a threshold, the system may not change the display to reflect such minimal driver movements. If some degrees of head rotation are permitted, the cameras 427 may be placed on a pan assembly that allows for horizontal rotation of the cameras 427. If some degrees of head shifting (left and right) are allowed, the cameras 427 may be placed on a robotic in-line sliding mechanism controlled by the system to allow for horizontal movements of the cameras that mirror the driver's head movements. If some degrees of freedom of head rotation (such as rotate left and right, as well as rotate up and down) and head shifting are desired, a combined solution of sliding and pan-tilted assembly may be used to move the cameras 427. For example, and without limitation, pan movement of the cameras 427 may be tied to "head shake," or left/right movement of the driver's head, while tilting of the cameras may correspond to a "head nod," or up/down movement of the driver's head.

Additionally, computer vision processing may be implemented to provide view-dependent rendering. For example, and without limitation, cameras with wide-angle lenses and computer vision processing may be used to modify distortions and account for the driver's head position and orientation. As another example, multi-camera arrays and computer vision processing may capture the frames of one or more cameras that best represents the driver's point of view based on the driver's current head position and orientation.

As shown, the memory 406 contains the 3D application 412, which is an application generally configured to generate and output, based on a 3D model, a stereoscopic three-dimensional rendering of an instrument control panel and a live video of the vehicle's exterior on the 3D display 425 of a vehicle. The 3D application 412 is further configured to continuously modify, when necessary, the 3D output displayed on the 3D display 425. For example and without limitation, if a driver specifies, through one or more input sources 422, that the video should be brought closer to the driver's face, the 3D application 412 may update the output of the 3D display 425 such that the 3D video is closer to the driver's face. The 3D application 412 may modify the output of the 3D display based on any number of other factors as well, including a computed driving context, an event, user preferences, or detecting the driver's gaze or viewing angle. The 3D application 412 may detect the driver's gaze or viewing angle using one or more sensors 426. The sensors 426 may be any type of sensors, including visual or thermal imagers, time-of-flight sensors, infrared and ultrasonic sensors, laser based sensors, and the like. The 3D application 412 may also include computer vision software that is connected to the 3D glasses worn by a driver in order to provide scene analysis and head tracking. In some embodiments, the 3D application 412 may harness processing power of devices not part of the system 400, such as smart phones, smart watches, or remote servers (such as in the cloud 460) over a wireless network. The 3D application 412 may also interface with a graphics processing unit (GPU), not pictured, in order to generate the 3D renderings described herein.

As shown, the storage 408 user data 414, which may include user preferences and the like. For example, and without limitation, the user data 414 may include entries for different drivers, specifying preferred color schemes, ordering, layer positions, and the like, for each item displayed on the 3D display 425. The 3D application 412 may use preferences in the user data 414 to influence the output it displays on the 3D display 425. The storage 408 also includes the instrument cluster (IC) data 417, which may be a repository of predefined templates for instrument control panels. The IC data 417 may include individual instrument controls, full layers of controls, and multiple layers of controls. The IC data 417 may include different shapes, sizes, and colors of instrument controls. Still yet, the IC data 417 may include predefined coordinates for each display element, the 3D video, and other instrument controls.

The cloud computing environment 460 includes among other resources, the user data 414, and other data 415. The other data 415 may include location-specific data, such as speed limits, laws, and other driving regulations. In one embodiment, the other data 415 is also included in the storage 408. The cloud computing environment 460 also includes an instance of the 3D application 412, which may be used to access other information on the Internet when necessary to assist the instance of the 3D application 412 in the computer 102. For example, and without limitation, if the instance 3D application 412 in the computer 102 cannot fully compute the driving context locally, the 3D application 412 in the cloud 460 may access additional data in order to notify the 3D application 412 in the computer 102 how to proceed.

Figure 5:
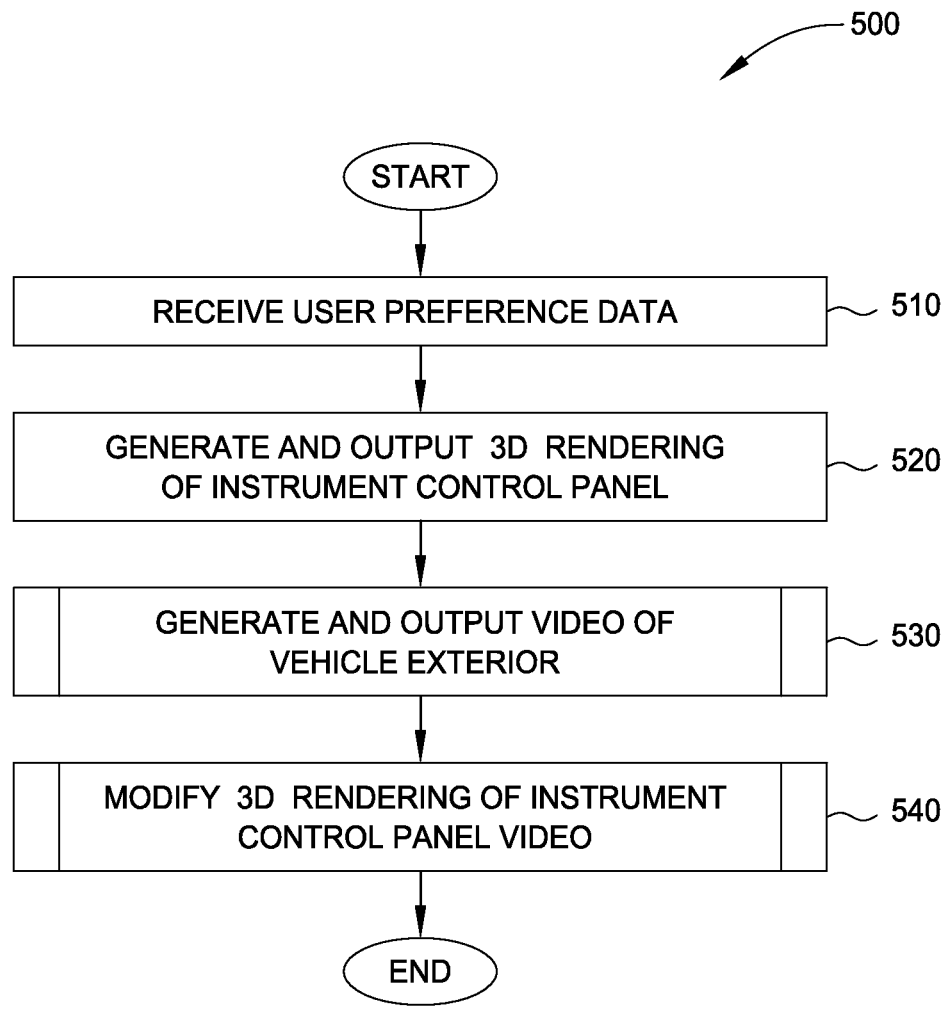
FIG. 5 is a flow diagram of method steps for generating a virtual see-through instrument cluster with live video, according to various embodiments of the present invention.

FIG. 5 is a flow diagram of method steps for generating a virtual see-through instrument cluster, according to various embodiments of the present invention. Although the method steps are described with respect to the systems of FIGS. 1-4, persons skilled in the art will understand that any system configured to perform the method steps, in any order, falls within the scope of the present invention.

As shown, a method 500 begins at step 510, where the 3D application 412 executing on processor 404 receives user preference data. The user preference data may include customized settings indicating a driver's preferred colors, positions, and other attributes of different display elements outputted for display on the 3D display 425. For example, and without limitation, a user may prefer that the speedometer and the tachometer be displayed side-by-side in at an approximately equal depth.

At step 520, the 3D application 412 generates and outputs a 3D rendering of the instrument control panel. Generally, the 3D rendering of the instrument control panel may include a speedometer, tachometer, odometer, fuel gauge, and any other instrument that may be displayed on a vehicle instrument control panel. At step 530, described in greater detail with reference to FIG. 8, the 3D application 412 captures and outputs a 3D video of the vehicle exterior. The 3D video may reflect any area captured by one or more cameras mounted on or in the vehicle. In one embodiment, the 3D video displays an area that is traditionally hidden from the driver's view, namely the portion of the road obstructed by the vehicle's hood/engine compartment. The 3D video is viewpoint dependent, in that the camera may move in order to capture 3D video from the driver's perspective. In one embodiment, the 3D rendering of the instrument control panel is displayed closer to the driver, with the 3D video appearing further away from the driver. In such an embodiment, the instrument control panel is more transparent in order to allow the driver to see through to the video. However, user preferences may specify to place the video nearer to the driver than some (or all) of the elements of the instrument control panel. In some embodiments, only the 3D video is displayed on the 3D display 425.

At step 540, described in greater detail with reference to FIG. 6, the 3D application 412 modifies the 3D renderings of the instrument control panel and video. The 3D application 412 may modify the 3D renderings of the instrument control panel and video responsive to an event, user input, a driving context, or the gaze (or viewing angle) of the driver. For example, and without limitation, if the vehicle has a light that no longer works, a new notification for the light may be added to the instrument control panel at a position near to the driver. As another example, as the vehicle's fuel level decreases during the course of operation, the fuel gauge may move from the background to the foreground while becoming brighter and bolder in order to capture the driver's attention. Generally, the 3D application 412 may modify the 3D renderings any number of times while the vehicle is being driven.

Figure 6:
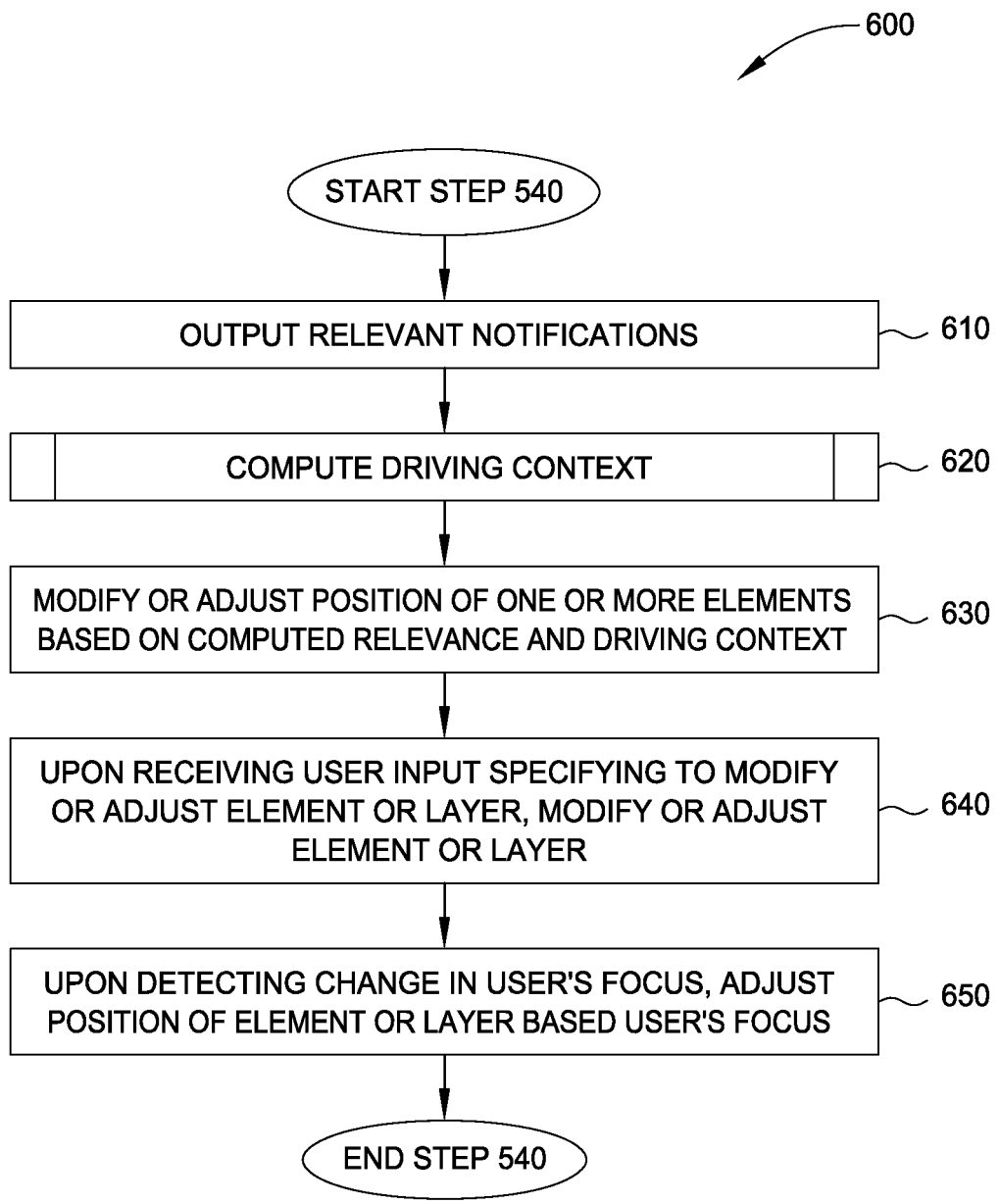
FIG. 6 is a flow diagram of method steps for modifying a 3D rendering of an instrument control panel with live video, according to various embodiments of the present invention.

FIG. 6 is a flow diagram of method steps for modifying a virtual see-through instrument cluster. Although the method steps are described with respect to the systems of FIGS. 1-4, persons skilled in the art will understand that any system configured to perform the method steps, in any order, falls within the scope of the present invention.

As shown, a method 600 begins at step 610, where the 3D application 412 executing on processor 404 outputs relevant notifications to the driver through the 3D display 425 in the vehicle. For example, and without limitation, the notifications can include navigation instructions or other navigation information, notifications regarding the vehicle (such as low tire pressure), or any other type of notification, such as SMS alerts, emails, and the like.

At step 620, described in greater detail with reference to FIG. 7, the 3D application 412 computes a current driving context. The driving context may include, but is not limited to, the vehicle's speed, the vehicle's location, an attribute or state of the vehicle (such as gas levels, fluid levels, or tire pressure), applicable laws or regulations at the vehicle's location, weather conditions, triggering events, and the like. For example, and without limitation, the 3D application 412 may use a wireless data connection to determine, based on the vehicle's GPS coordinates, that the current speed limit is 65 miles per hour. If the vehicle is traveling at a speed of 85 miles per hour, the driving context may indicate that the driver is speeding. Furthermore, the 3D application 412 may identify that because of the driving context, the speedometer has an increased relevance or importance, and should be adjusted or emphasized in order to catch the driver's attention. The 3D application 412 may compute the driving context periodically, or responsive to detecting some event, such as a blown tire.

At step 630, the 3D application 412 may modify or adjust the position of one or more display elements based on the computed driving context and the relevance of the one or more display elements. The one or more display elements may be at the same or different depths. For example, and without limitation, the 3D video may be moved to a different depth, or the speedometer may move from one depth to another depth.

At step 640, the 3D application 412 modifies an element or its position responsive to receiving user input to modify or adjust the position of the element (or an entire layer of elements). The user input may be received from any feasible input source, including a physical wheel controller similar to a dimming controller, a physical slider, a set of buttons, digital settings through a vehicle infotainment system, and the like. At step 650, the 3D application 412 adjusts the depth of a display element or layer upon detecting a change in the driver's gaze. For example, and without limitation, if eye-tracking sensors determine that the driver is gazing at the odometer, which is in a layer farther away from the driver, the 3D application 412 may move the odometer closer to the driver. Additionally, the 3D application 412 may modify the appearance of the odometer to make it easier for the driver to see, such as by changing its color, opacity, and size.

Figure 7:
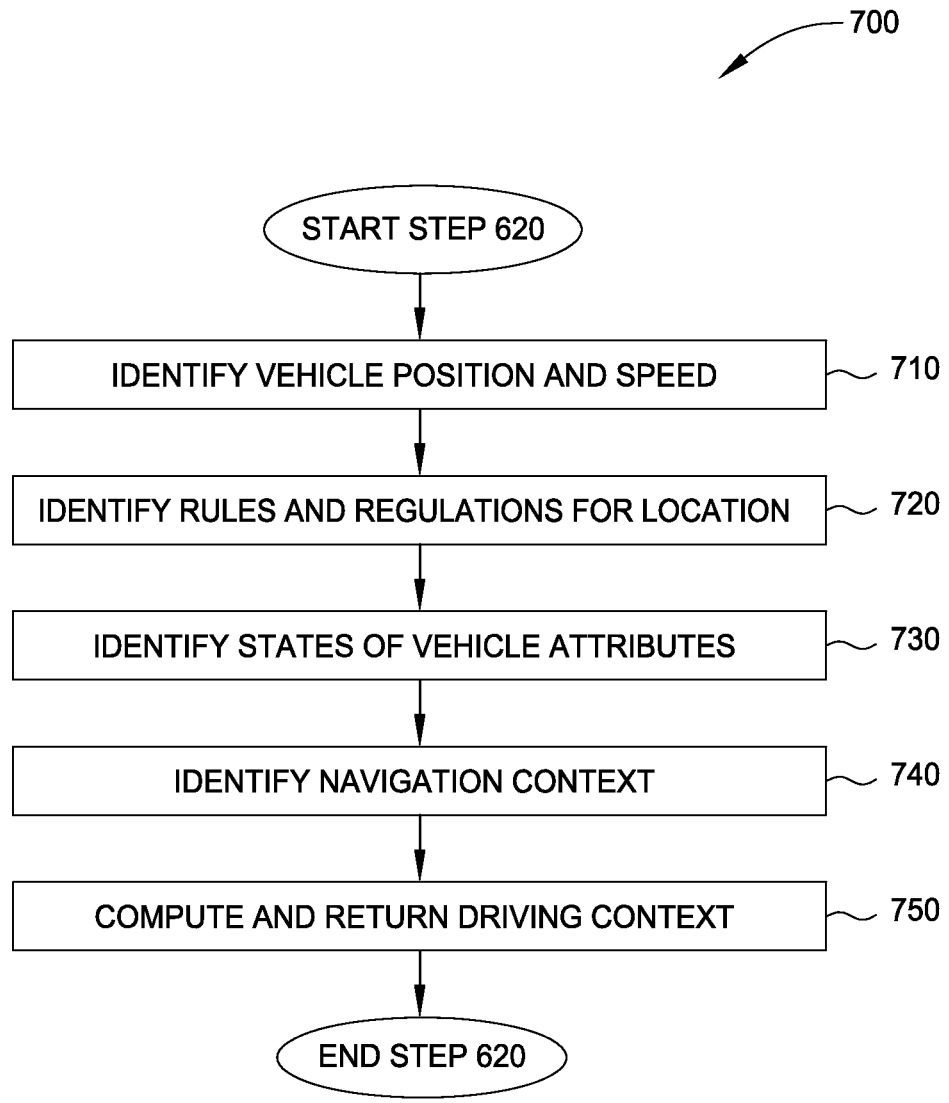
FIG. 7 is a flow diagram of method steps for computing a driving context for a driver of a vehicle, according to various embodiments of the present invention.

FIG. 7 is a flow diagram of method steps for computing a driving context for a driver of a vehicle, according to various embodiments of the present invention. Although the method steps are described with respect to the systems of FIGS. 1-4, persons skilled in the art will understand that any system configured to perform the method steps, in any order, falls within the scope of the present invention.

As shown, a method 700 begins at step 710, where the 3D application 412 executing on processor 404 identifies the vehicle position using GPS coordinates and the vehicle's speed using the speedometer data. At step 720, the 3D application 412 identifies any applicable rules and regulations for the vehicle's current location, such as the speed limit, parking rules, passing rules, and the like. For example, and without limitation, if the vehicle is in a no-passing zone, the 3D application 412 may output a notification indicating that passing other vehicles is not allowed. The rules and regulations may be stored locally in the vehicle, or retrieved from a remote location using a wireless data connection in the vehicle. At step 730, the 3D application 412 identifies the state of one or more vehicle attributes, such as fuel levels, current speed, tire pressure, mileage since last oil change, and the like. For example, and without limitation, if the vehicle has not had an oil change in over 10,000 miles, the system may output a notification to the driver to have the oil changed. At step 740, the 3D application 412 identifies the current navigation context, which includes current and pending navigation system instructions and notifications. For example, and without limitation, the 3D application 412 may determine that there are no navigation instructions for display in the next 10 miles, leaving additional space near the driver that the system can utilize for display elements that are not related to the navigation system. At step 760, the 3D application 412 may compute and return the driving context. The driving context may specify one or more display elements (such as the speedometer, odometer, and the like), layers, or the navigation system as being of high relevance or importance. In response, the 3D application 412 may modify the position or appearance of the identified elements or layers.

Figure 8:
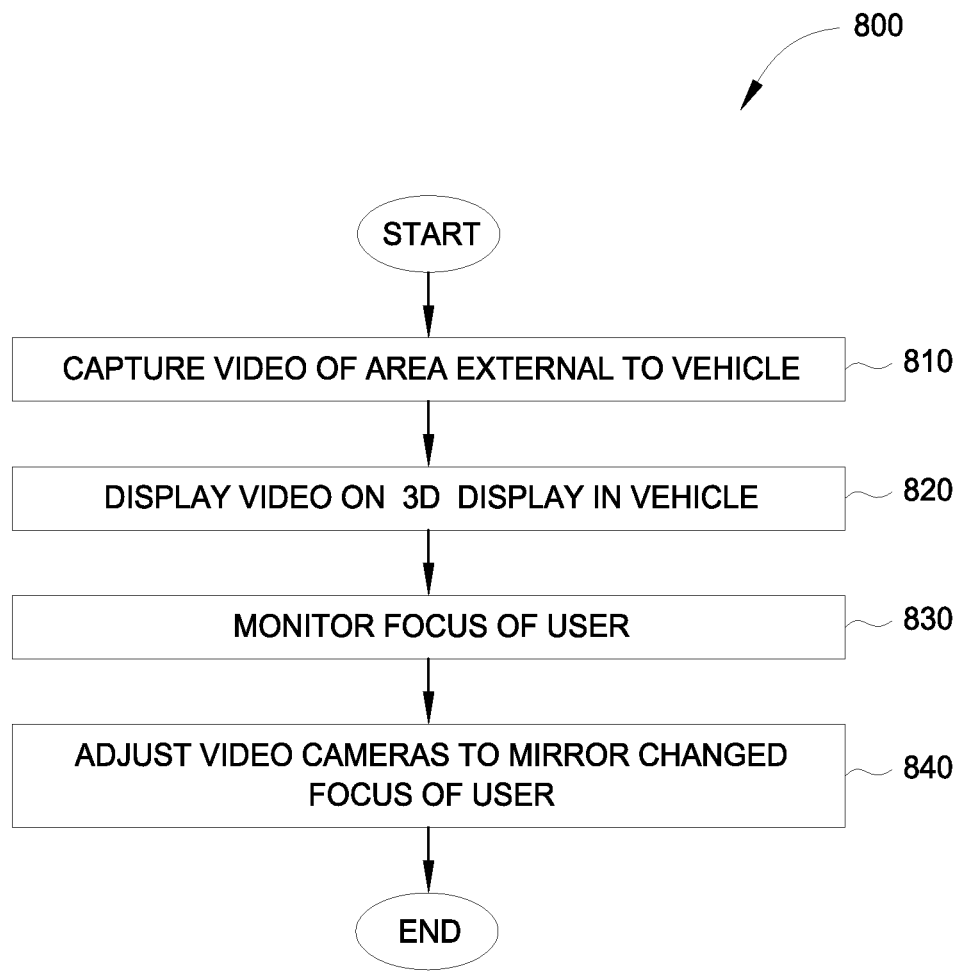
FIG. 8 is a flow diagram of method steps for adjusting video cameras to reflect a driver's gaze, according to various embodiments of the present invention.

FIG. 8 is a flow diagram of method steps for adjusting video cameras to reflect a driver's gaze, according to various embodiments of the present invention. Although the method steps are described with respect to the systems of FIGS. 1-4, persons skilled in the art will understand that any system configured to perform the method steps, in any order, falls within the scope of the present invention.

As shown, a method 800 begins at step 810, where one or more cameras 427 capture a video of an area external to a vehicle. As previously described, any type of camera may be used, including, without limitation, movable cameras, depth imagers and RGB cameras, and an array of fixed cameras. At step 820, the 3D application 412 executing on processor 404 renders and displays the captured video on the 3D display 425. At step 830, the 3D application 412 monitors the gaze of the driver in order to capture and display viewpoint dependent video on the 3D display 425. The 3D application 412 may additionally or alternatively monitor the viewing angle of the driver at step 830. At step 840, the 3D application 412 adjusts a position of the video cameras 425 in order to mirror the changed gaze of the driver. The 3D application 412 may continue to monitor the gaze of the driver, change the focus of the cameras to match the gaze of the driver, and output the captured video on the 3D display 425.

Embodiments disclosed herein provide a "see-through" instrument cluster that allows a driver to view areas traditionally obstructed from the driver's view. By displaying a video of an area external to the vehicle, embodiments disclosed herein expand the driver's field of view to include complete objects that extend from the traditional view to an obstructed view, and also to include objects that may have been completely obstructed from the driver's view.

Advantageously, embodiments disclosed herein provide a wider visibility area in front of their car. The wider visibility area provides the possibility to detect objects in front of the vehicle while driving, parking, or otherwise operating the vehicle. The view dependent capture of the 3D video also provides an enhanced experience to the driver, as the video is captured according to the driver's current vantage point.

The 3D instrument cluster is given a more realistic look and feel relative to traditional, two-dimensional instrument clusters.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for displaying live video in a vehicle, comprising:
   capturing a video of an area external to the vehicle;
   generating, via a stereoscopic display surface disposed within the vehicle, a plurality of display layers, wherein each display layer has a different perceived depth relative to a driver of the vehicle and the stereoscopic display surface;
   causing one or more display elements to be displayed in a first stereoscopic image within a first display layer included in the plurality of display layers that has a first perceived depth relative to the driver of the vehicle and the stereoscopic display surface; and
   causing a representation of the video to be displayed in a second stereoscopic image within a second display layer included in the plurality of display layers that has a second perceived depth relative to the driver of the vehicle and the stereoscopic display surface,
   wherein the first perceived depth is different from the second perceived depth such that one display layer of the first display layer and the second display layer is disposed in front relative to the driver of the vehicle and is transparent to allow the driver of the vehicle to see through the one display layer.

2. The method of claim 1, wherein at least a portion of the area external to the vehicle is obstructed from view of the driver.

3. The method of claim 1, wherein capturing the video comprises:
   detecting a gaze of the driver; and
   causing a camera capturing the video to match the gaze of the driver.

4. The method of claim 3, further comprising:
   determining that the gaze of the driver has changed; and
   capturing subsequent frames of video to match the changed gaze of the driver.

5. The method of claim 1, further comprising:
   generating a three-dimensional representation of a vehicle instrument cluster that includes a plurality of instruments;
   outputting the three-dimensional representation of the vehicle instrument cluster at the first perceived depth; and
   outputting the representation of the video at the second perceived depth.

6. The method of claim 1, wherein a distance between an object displayed in the representation of the video and the driver is based on a distance between the object and the vehicle.

7. The method of claim 1, further comprising causing at least one of the first perceived depth and the second perceived depth to be changed in response to at least one of a speed of the vehicle, a location of the vehicle, a change in a state of operability of the vehicle, a fuel or fluid level of the vehicle, and road conditions.

8. The method of claim 1, further comprising causing at least one of the first perceived depth and the second perceived depth to be changed in response to an object being located in a blind spot of the vehicle.

9. A non-transitory computer-readable storage medium including instructions that, when executed by a processor, cause the processor to display live video in a vehicle, by performing the steps of:
   capturing a video of an area external to the vehicle;
   generating, via a stereoscopic display surface disposed within the vehicle, a plurality of display layers, wherein each display layer has a different perceived depth relative to a driver of the vehicle and the stereoscopic display surface;
   causing one or more display elements to be displayed in a first stereoscopic image within a first display layer included in the plurality of display layers that has a first perceived depth relative to the driver of the vehicle and the stereoscopic display surface; and
   causing a representation of the video to be displayed in a second stereoscopic image within a second display layer included in the plurality of display layers that has a second perceived depth relative to the driver of the vehicle and the stereoscopic display surface,
   wherein the first perceived depth is different from the second perceived depth such that one display layer of the first display layer and the second display layer is disposed in front relative to the driver of the vehicle and is transparent to allow the driver of the vehicle to see through the one display layer.

10. The non-transitory computer-readable storage medium of claim 9, further comprising:
    detecting a change in a viewing angle of the driver; and
    adjusting a camera capturing the video to match the changed viewing angle of the driver.

11. The non-transitory computer-readable storage medium of claim 10, further comprising:
    prior to adjusting the camera, determining that an amplitude of the change in the viewing angle exceeds a specified threshold.

12. The non-transitory computer-readable storage medium of claim 10, wherein the viewing angle of the driver is based on an orientation of a head of the driver.

13. The non-transitory computer-readable storage medium of claim 9, wherein the video is outputted as a three-dimensional video.

14. The non-transitory computer-readable storage medium of claim 9, wherein a distance between the video and the driver is based on a set of driver preferences.

15. A system to display live video in a vehicle, comprising:
- one or more computer processors;
- at least one camera configured to capture a video of an area external to the vehicle; and
- a stereoscopic display surface disposed within the vehicle, wherein the one or more computer processors execute instructions and perform the steps of:
  - generating, via the stereoscopic display surface disposed within the vehicle, a plurality of display layers, wherein each display layer has a different perceived depth relative to a driver of the vehicle and the stereoscopic display surface;
  - causing one or more display elements to be displayed in a first stereoscopic image within a first display layer included in the plurality of display layers that has a first perceived depth relative to the driver of the vehicle and the stereoscopic display surface; and
  - causing a representation of the video to be displayed in a second stereoscopic image within a second display layer included in the plurality of display layers that has a second perceived depth relative to the driver of the vehicle and the stereoscopic display surface,
  - wherein the first perceived depth is different from the second perceived depth such that one display layer of the first display layer and the second display layer is disposed in front relative to the driver of the vehicle and is transparent to allow the driver of the vehicle to see through the one display layer.

16. The system of claim 15, wherein the display comprises a stereoscopic, parallax-enabled three-dimensional display.

17. The system of claim 15, wherein the at least one camera comprises at least one of two robotic pan-tilt-shift cameras mounted on a front bumper of the vehicle, and an array of a plurality of fixed cameras mounted on the front bumper of the vehicle.

18. The system of claim 17, wherein the at least one camera comprises the two robotic pan-tilt-shift cameras, wherein the one or more computer processors perform the further steps of:
- detecting a gaze of the driver; and
- adjusting each camera in the set of cameras to capture the video to match the gaze of the driver.

19. The system of claim 17, wherein the set of cameras comprises the array of fixed cameras, wherein the one or more computer processors perform the further steps of
- detecting a gaze of the driver; and
- adjusting a capture of the array of fixed cameras to capture the video to match the gaze of the driver.

20. The system of claim 19, wherein adjusting the capture of the array of fixed cameras comprises at least one of selecting two of the plurality of fixed cameras, and using a subset of an image data captured by two of the plurality of fixed cameras to create a composite view of the two of the plurality of fixed cameras.

21. The system of claim 17, wherein the one or more computer processors are configured to:
- determine that a gaze of the driver has changed; and
- modify the at least one camera to capture video based on the changed gaze of the driver.

22. The system of claim 15, further comprising:
- a set of driver-facing sensors configured to detect a gaze of the driver.

* * * * *